July 17, 1951 W. D. LEWIS 2,560,806

ECHO SUPPRESSION IN TRANSMISSION LINES

Filed March 5, 1948 3 Sheets-Sheet 1

INVENTOR
W. D. LEWIS
BY
ATTORNEY

INVENTOR
W. D. LEWIS
BY N. S. Ewing
ATTORNEY

FIG. 5

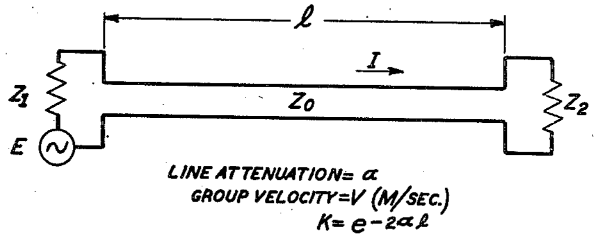

LINE ATTENUATION = $\alpha$
GROUP VELOCITY = V (M/SEC.)
$K = e^{-2\alpha\ell}$

REFLECTION COEFFICIENTS: $r_1 = \frac{Z_0 - Z_1}{Z_0 + Z_1}$; $r_2 = \frac{Z_0 - Z_2}{Z_0 + Z_2}$ $$I = E\,\frac{1+r_2}{Z_0+Z_1}\,e^{-\alpha\ell}\,\frac{e^{-j\phi}}{\sqrt{1+\rho^2+2\rho\cos\frac{4\pi\ell f}{V}}}$$

$$\rho = r_1 r_2 e^{-2\alpha\ell}$$

$$\tan\phi = \frac{1+\rho}{1-\rho}\ \tan\frac{4\pi\ell f}{V}$$

FIG. 6

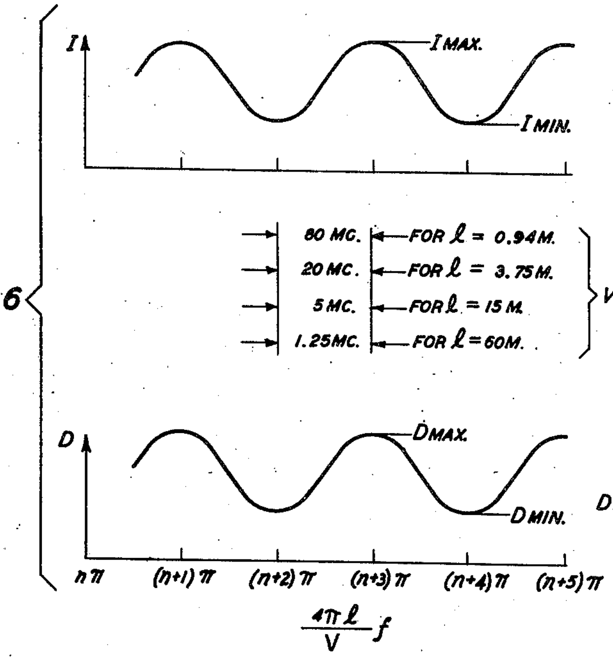

$$\frac{I_{MAX.}}{I_{MIN.}} = \frac{1+\rho}{1-\rho}$$

$V = 3\times10^{10}$ CM/SEC.

$$D = \frac{1-\rho^2}{1+\rho^2-2\rho\cos\frac{4\pi\ell f}{V}}\cdot\frac{\ell}{V}$$

$$D_{MAX.} - D_{MIN.} = 4\rho\frac{\ell}{V}\ \text{SEC.}$$
$(\rho \ll 1)$

INVENTOR
W. D. LEWIS
BY N. S. Ewing
ATTORNEY

Patented July 17, 1951

2,560,806

UNITED STATES PATENT OFFICE 2,560,806

ECHO SUPPRESSION IN TRANSMISSION LINES

Willard D. Lewis, Little Silver, N. J., assignor to Bell Telephone Laboratories, Incorporated, New York, N. Y., a corporation of New York Application March 5, 1948, Serial No. 13,263

14 Claims. (Cl. 178—44)

This invention relates to electric transmission lines and more particularly to echo suppression circuits therefor.

An object of the invention is to suppress echoes in transmission lines by sampling the echo to the exclusion of the signal.

Another object of the invention is to suppress echoes in transmission lines by sampling the echo to the exclusion of the signal, and propagating the echo and signal in separate paths of like transmission characteristics.

Another object of the invention is to neutralize echoes extending over a broad band of frequencies and present in transmission lines.

A feature of the invetion is a directional coupler for sampling the reflected wave or echo in the main transmission line to the exclusion of the desired signal.

Another feature of the invention is a directional coupler for inserting an amplified echo sample into the main transmission line in a direction opposite to the desired direction for signal transmission.

Another feature is a broad band phase and delay equalizers for a main transmission line, whereby an echo and its amplified sample may be propagated in separate paths, whose transmission characteristics are thereby substantially matched.

Another feature of the invention is a pair of directional couplers and an intervening amplifier, for connection to a main wave guide transmission line or the like, one coupler for sampling the echo and the other for reinserting an amplified echo sample into the main line to cancel the original echo.

Referring to the figures of the drawing:

Figs. 5 and 6 are explanatory diagrams applicable to the radio relay system of Fig. 4.

In long transmission lines intended for fidelity of transmission of speech and other signals, distortions may arise from reflections due to impedance discontinuities therein, whereby undesirable "echoes" are produced.

Echoes are known to originate at impedance irregularities in a long line, whereat a portion of the signal energy is reflected back toward the source of signals. Upon striking another impedance discontinuity, the reflected wave may be delayed by a time interval in reaching a receiver at the far end of the line, thereby providing an echo or ghost effect for the original signal.

It has been proposed heretofore to abstract from a signal transmission line a sample or attenuated replica of the signals being transmitted, and to insert the sample back into the line in such phase and amplitude as to oppose or neutralize signal echoes appearing therein.

In accordance with the invention, echo effects may be neutralized in long transmission lines by connecting thereto a pair of spaced directional couplers, one coupler feeding an echo sample into an amplifier, whose output is connected to the other coupler. An echo in the main line is sampled by the first directional coupler, amplified and the amplified sample is then reinserted by the second coupler into the main line but in opposite phase and equal amplitude to the echo, whereby cancellation of the echo ensues.

Figure 1:
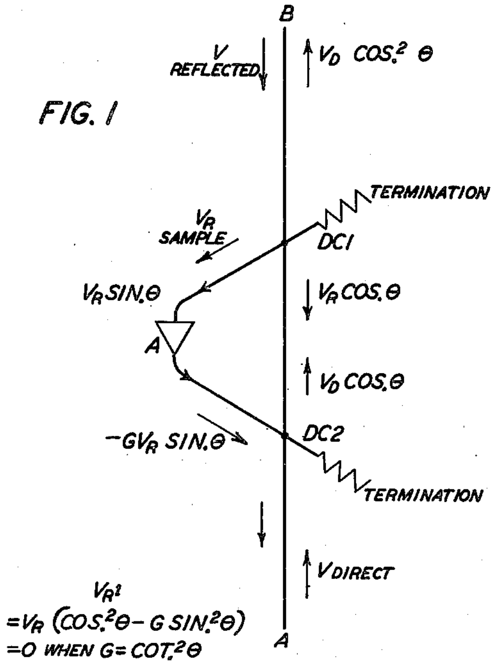
Fig. 1 shows schematically echo-cancelling circuits for transmission lines.

Referring to Fig. 1 of the drawing, the echo-cancelling circuit is shown schematically connected to a main transmission line AB. The main signal $V_{Direct}$, passes through the circuit AB suffering only a sampling loss due to the presence of two directional couplers in the transmission line, and reaches B with amplitude represented as $V_D \cos^2 \theta$, where $\theta$ is a parametric angle, which defines mathematically the transmission characteristics of the directional coupler. Assuming an input wave E to the directional coupler with voltage V, then the two output waves would be related to each other in voltage as $V \cos \theta$ and $V \sin \theta$. At B, reflection occurs due to mismatch in impedances or to presence of discontinuities, etc., whereby a reflected wave $V_R$ is set up, propagating along the transmission line in the direction BA. A sample of the reflected wave or echo is extracted by the directional coupler $DC_1$, amplified by amplifier A and reinserted into the main line by the second coupler $DC_2$ to cancel the original echo.

If the two directional couplers $DC_1$ and $DC_2$ are equal (a condition not essential to the operation of the circuit) and divide voltages in the ratio of $\cos \theta : \sin \theta$, then the gain of the amplifier must be $$G = \cot^2 \theta$$

in order to provide ideal cancellation by the reinserted echo. This is evident from the following analysis:

The reflected wave $V_r$ is sampled by the directional coupler $DC_1$ and after passage therethrough, has an amplitude $V_R \sin \theta$. This echo sample is applied to the amplifier A wherein amplification produces an amplified sample with amplitude $-GV_R \sin \theta$, where G represents the amplifier gain. The amplified sample passes through directional coupler $DC_2$ and is reinserted into the line with a vector amplitude $-GV_R \sin^2 \theta$.

Concomitantly, the main echo $V_R$, which is propagating along the main line BA, suffers a directional coupler loss twice, i. e., at $DC_1$ and $DC_2$, respectively, and finally reaches point B with diminished amplitude $$V_{R'} = V_R \cos^2 \theta$$

For complete echo cancellation, the condition $$V_R \cos^2 \theta - GV_R \sin^2 \theta = 0 \quad (1)$$

should be satisfied.

Accordingly, echo cancellation is achieved in the present system when $G = \cot^2 \theta$.

The amplitude of the signal wave at B, previously expressed as $V_D \cos^2 \theta$, may also be expressed in terms of G as:

$$V_D \frac{G}{G+1}$$

This relation indicates in particular that the use of a 20-db. amplifier A will involve approximately a 1-db. loss in the direct wave, whereas the use of a 40-db. amplifier, will involve only a 0.1-db. loss.

Figure 2:
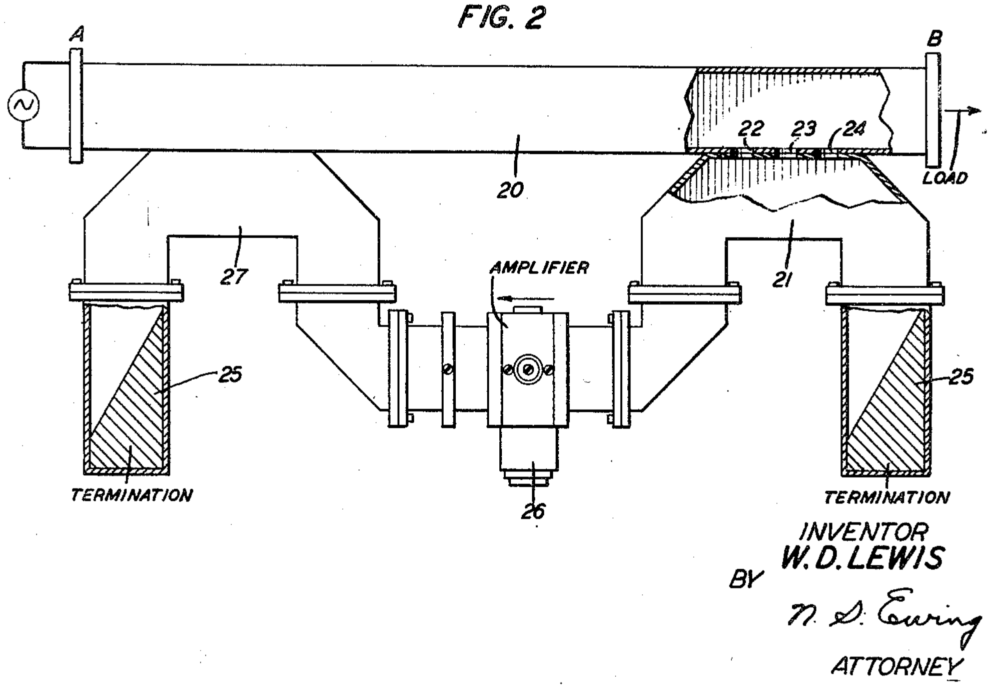
Fig. 2 shows an echo-cancelling circuit for a wave guide line.

Referring to Fig. 2, which shows an echo-cancelling circuit for the microwave range, for example, around 4,000 megacycles, 20 represents the main wave guide, which may be rectangular in cross-section. The direct wave is assumed to travel from A toward B and be utilized in a useful load, while the reflected wave travels from B toward A as in Fig. 1. A microwave source such as a velocity-modulated oscillator, closely spaced triode, magnetron or the like may be used, or also the final stage of a microwave amplifier may be the input.

A directional coupler 21 of the type disclosed in the United States application of W. W. Mumford, Serial No. 540,252, filed June 14, 1944, is coupled to the main guide 20 by three holes 22, 23, 24 to sample the reflected wave. A tapered mass of lossy material 25 serves as a termination in the coupler for absorption of signal and other energy, which does not flow in the desired direction. The echo as sampled by coupler 21 flows toward the amplifier 26 which may be a microwave amplifier of the velocity-modulator type or a traveling wave amplifier of the type disclosed in the United States application of J. R. Pierce, Serial No. 640,597, filed January 11, 1946, or a closely spaced triode amplifier of the type disclosed in the United States application of J. A. Morton et al., Serial No. 572,596, filed January 13, 1945, now United States Patent 2,502,530, granted April 4, 1950.

The amplified sample of the original echo, appearing in the output of amplifier 26, is then applied to a second directional coupler 27, which may be structurally identical to the first coupler 21. The coupler 27, which connects to the main wave guide 20 through apertures, effectively reinserts into the guide at this point an echo sample of equal magnitude to and in opposite phase with the original echo. Cancellation of the reflected wave occurs, irrespective of its original amplitude or phase, and disturbing echo effects caused thereby are eliminated from the desired signal. Under these circumstances, the wave guide presents an effective constant impedance looking into it at point A.

As previously indicated, the gain of the amplifier should preferably be such that $$G = \cot^2 \theta$$

in order to obtain the complete cancellation of echoes just described. The amplifier, however, may be operated at other gain values depending on the degree of cancellation which may be tolerated, and likewise corresponding tolerances in phase opposition for the echo and its amplified sample are envisaged in practical applications of the circuit.

The amplifier 26 may be a single stage as shown in Fig. 2, operating, for example, in the 4,000-megacycle band. Because of the small delay obtained with such an amplifier, effective cancellation over a narrow band can be obtained without regard to delay differences between the amplifier 26 and the main line 20. Any number of stages of amplification may be used without regard to delay differences if cancellation over only a sufficiently narrow band is desired.

Figure 3:
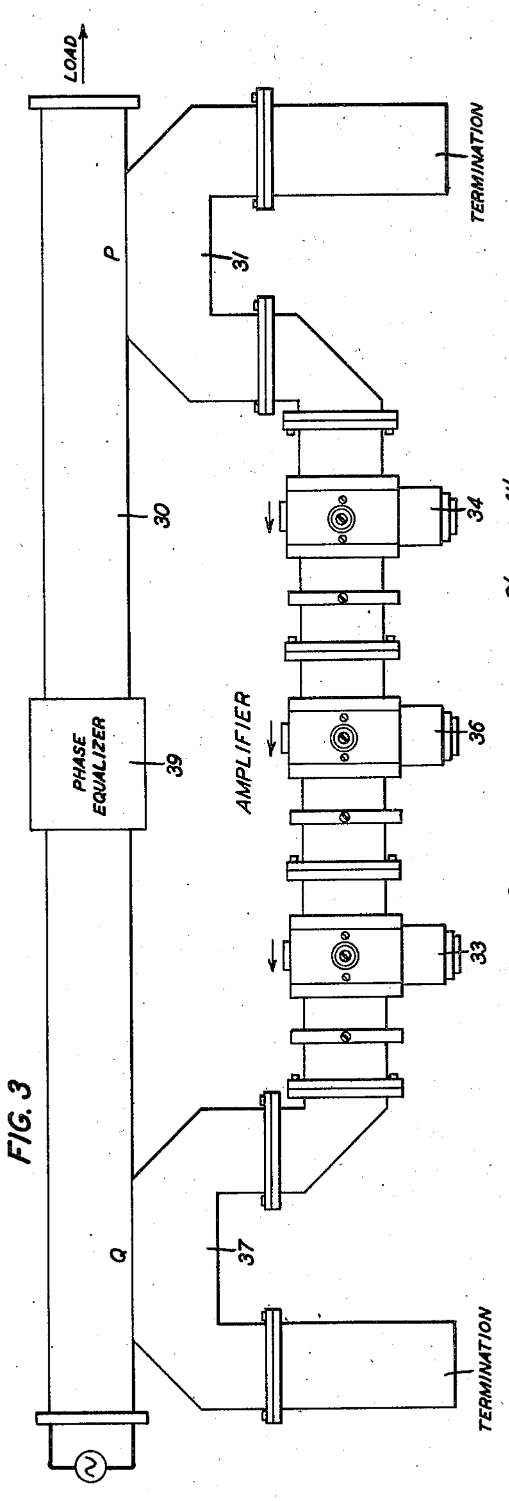
Fig. 3 shows a modification of the echo-cancelling circuit shown in Fig. 2.

Fig. 3 shows a broad band transmission system and an echo-cancellation circuit therefor in accordance with the invention. Directional couplers designed for broad bands and broad band amplifiers are utilized in this system, which in circuital arrangement is otherwise quite similar to the circuit of Fig. 2.

The broad band amplifier may be a multistage type comprising, as illustrated in Fig. 3, individual amplifiers 33, 34, 36, of the type shown in Fig. 2, with overlapping resonance characteristics, or alternatively a single broad band amplifier of the traveling wave type disclosed in the United States application of J. R. Pierce, Serial No. 640,597, filed January 11, 1946, may be used in lieu thereof. The directional coupler may be of the type disclosed in the United States application of S. Rosen and J. T. Bangert, Serial No. 774,828, filed September 18, 1947, now United States Patent 2,541,910, granted February 13, 1951.

A phase equalizer 39 is inserted in the main wave guide 30, intermediate points P and Q at which the directional couplers 31, 37 are attached. The phase equalizer may be a network of the type disclosed in the United States patent application of A. G. Fox, Serial No. 452,851, filed July 30, 1942, now United States Patent 2,432,093, granted December 9, 1947, or of the type disclosed in the United States patent application of W. D. Lewis-L. C. Tillotson, Serial No. 789,986, filed December 5, 1947, now United States Patent 2,510,288, granted June 6, 1950, or W. D. Lewis, Serial No. 789,985, filed December 5, 1947, now United States Patent 2,531,447, granted November 28, 1950. The phase-frequency characteristics of the latter networks are designed so as to equalize delays and phase differences over a broad band, rendering the main and branch paths alike in transmission properties.

Alternatively, in lieu of the phase equalizer networks aforementioned, it may be desirable to add an extra loop of wave guide to the main guide 30 between the couplers 31, 37 whereby delays and phase differences over a broad band are equalized in the manner aforementioned.

Figure 4:
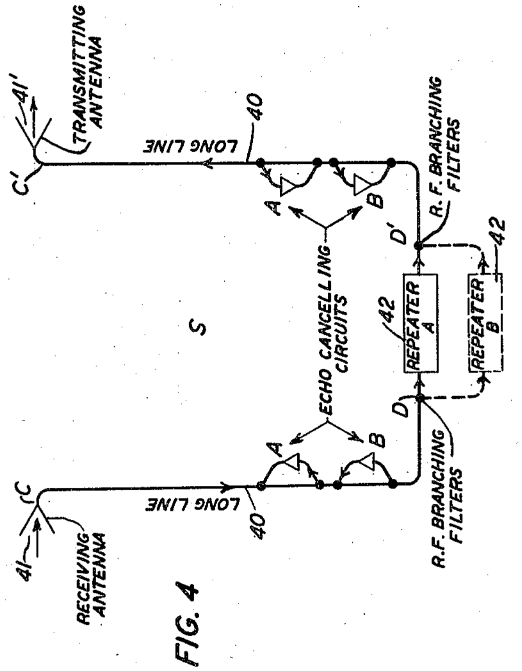
Fig. 4 shows a radio relay link repeater station with echo-cancelling circuits applied thereto.

Fig. 4 shows echo cancellation circuits in accordance with the invention as applied to a radio relay link system S of the type disclosed in the United States application of W. D. Lewis, Serial No. 789,985, filed December 5, 1947, now United States Patent 2,531,447, granted November 28, 1950. In such a system, the echoes due to double reflections in and at the ends of the long wave guide lines 40, which connect the antennas 41, 41' respectively, to the amplifying equipment in the microwave repeaters $4_2$A, $4_2$B and the associated radio frequency branching filters, introduce objectionable phase and amplitude distortion in echo-cancelling circuits A, B of the type heretofore disclosed are connected to the main wave guides 40 respectively, as shown in Fig. 4 and will effectively eliminate any double reflections caused by impedance discontinuities therebeyond. With the circuits A, B placed as shown in Fig. 4, any echoes arising at repeater, radio frequency filter, antenna, etc., discontinuities will be eliminated thereby. The details of the nature of the signals transmitted, of the antennas 41; radio frequency branching filters, the repeaters are more fully disclosed in the United States application of W. D. Lewis Serial No. 789,985, filed December 5, 1947, now United States Patent 2,531,447, granted November 28, 1950.

To better appreciate specifically how echoes may arise in radio relay systems, it should be noted that the usual presence of a large amount of equipment in the repeater amplifier makes it desirable, from the maintenance standpoint, to locate the amplifier near the ground and to provide towers for the antenna where antenna elevation is necessary. This means relatively long transmission lines 40 between the antenna and the rest of the repeater. If exact termination of the line by the antenna impedance and by the filter input impedance were possible no appreciable distortion would be produced, but in general there will be a mismatch and a corresponding reflection of energy at each of these junctions which will produce variations in the amplitude and delay of the signal throughout the desired band which may be greater than those produced anywhere else in the repeater.

The type of distortion originating in this way is schematically illustrated by Fig. 5. In this figure there is represented an antenna of impedance, $Z_1$, connected by a line length, $l$, and characteristic impedance, $Z_0$, to a load, $Z_2$. In actual practice this load is the impedance presented by the filter to the line from the antenna. The variations produced in both the amplitude I and delay D of the signal currents are shown by the curves in Fig. 6 where relative change in the characteristics in question are shown as ordinates and values of the quantity $$\frac{4\pi lf}{V}$$

are shown as abscisses, where $f$ is the frequency and $$V=3\times\frac{10^{10}\text{ cm.}}{\text{sec.}}$$

It will be seen from these curves that the amount of variation over a given band is a function of the line length. With short lines the amount of variation over a band 10 megacycles wide can be kept very small, but with lines about 150 feet in length there may be three or four full cycles of variations in a band 10 megacycles wide. Table A below gives some typical values of the variations. Values are given for those degrees of mismatch which would produce standing wave ratios of 1, 1.4 and 2 decibels at the junctions. It will be seen that for lines between 100 and 200 feet in length and SW ratios at the terminals between 1 and 2 decibels, the variations in many cases are greater than the limits achieved in the multistage amplifiers and other components of the system. Furthermore, it is usually impractical to compensate or tune out these variations because they are functions of the electrical length of the transmission lines and subject to change with temperature, frequency, and other small mechanical and electrical changes.

*Table A*

| $SWR_1=SWR_2$ in db. $(K=1)$<br>$r_1=r_2$ $(K=1)$ | 1<br>0.058 | 1.4<br>0.082 | 2<br>0.115 |
|---|---|---|---|
| Max. Amplitude Variation in db | 0.058 | 0.116 | 0.233 |
| Max. Delay Variation in $10^{-9}$ seconds: | | | |
| $l$=100 feet | 1.33 | 2.67 | 5.33 |
| $l$=200 feet | 2.67 | 5.33 | 10.66 |

Echo-cancelling circuits of the type illustrated in Figs. 2 and 3, when inserted in the wave guide line 40 as shown in Fig. 4 will eliminate reflections arising at both ends of line 40. Also, it should be understood that reflection due to discontinuities at the radio frequency branching filters associated with the repeaters, or reflections due to interaction between channel repeaters or any combination of these may be effectively eradicated by a single echo cancellation circuit of the type shown in Fig. 2.

Plural cancellation circuits, effective for various frequency channels, may also be used as shown in Fig. 4 particularly in conjunction with the corresponding channel repeaters 42A, 42B.

Likewise, it should be understood that echo-cancelling circuits of coaxial type for use with coaxial lines may be utilized in accordance with the principles of the invention without departing from the spirit thereof.

The principles of the invention may be practiced in coaxial systems by the use of coaxial directional couplers, for example, as disclosed in the United States application of W. W. Mumford, Serial No. 540,252, filed June 14, 1944, and known types of coaxial amplifiers.

The echo-cancelling circuit heretofore disclosed may be used in wave guide systems of circular, square or elliptical cross-section form. Such guides per se may form long transmission lines or be connecting components of radio relay link systems.

What is claimed is:

1. In combination with a shielded transmission line carrying electromagnetic microwave signals in a first direction of transmission and echoes of said signals in the opposite direction of transmission, directionally-selective coupling means for deriving a sample of said echoes to the exclusion of said signals, means for amplifying said derived sample, and means for inserting the amplified sample into said line in such phase and amplitude as to substantially reduce said echoes.

2. The structure according to claim 1, wherein said means for inserting the amplified sample is directional insertion means for inserting said sample in substantially only the said opposite direction of transmission.

3. In combination with a shielded transmission line carrying electromagnetic microwave signals in a first direction of transmission and echoes of said signals in the opposite direction of transmission, means for deriving a sample of said echoes, means for amplifying said derived sample, and directional insertion means for launching the amplified sample into said line in substantially only the said opposite direction of transmission and in such phase and amplitude as to reduce said echoes.

4. In combination a source of microwave electromagnetic wave energy, a wave guide transmission line adapted to convey said energy connected thereto, a pair of spaced directional couplers connected in said line, an amplifier connected between said couplers in a branch connected to said line, the gain of said amplifier being $\cot_2 \theta$, where $\theta$ is the parametric angle in the expression $\cos \theta$ which expression defines the coupling ratio of one of said couplers to said energy along said line, whereby reflections are cancelled in said line and a constant impedance is presented to said source.

5. Echo suppression circuit comprising a main shielded transmission line adapted to convey microwave electromagnetic wave energy, a pair of spaced directional couplers connected thereto, one thereof adapted to exclusively sample a reflected wave, an amplifier connected to said sampling coupler to amplify said sample of said reflected wave, said second coupler adapted to reinsert said amplified sample into said main line to cancel the echo, and a load connected to said line.

6. In combination, an electrical signal transmission line carrying electromagnetic microwave signals, a reentrant branch circuit extending between a pair of spaced points along said line, said branch circuit comprising a pair of like-poled directional couplers, one located for directionally-selective electrical coupling to said transmission line at each of said points, and a signal transmitting connection connected between said couplers, said connection and said couplers of said branch circuit having combined amplitude attenuation characteristics substantially matching the amplitude attenuation characteristics of the portion of said line between said spaced points.

7. A combination in accordance with claim 6 including a phase equalizer in said portion of said signal transmission line to adjust the phase characteristics of said line with respect to the phase characteristics of said branch.

8. In combination with a shielded transmission line carrying electromagnetic microwave signals in a first direction of transmission and echoes of said signals in the opposite direction of transmission, directionally-selective electrical coupling means for deriving a sample of said echoes to the exclusion of said signals at a point on said transmission line, directional insertion means located at a second point in said opposite direction from said first point for electrically coupling to said transmission line, and a connection for transmitting said derived sample connected between said sampling coupling means and said insertion coupling means, said connection and both said coupling means having combined amplitude gain characteristics substantially matching the amplitude gain characteristics of the portion of said transmission line between said first and second points.

9. In combination with a shielded transmission system carrying electromagnetic microwave signals in a first direction of transmission and echoes of said signals in the opposite direction of transmission, a pair of spaced directional couplers, one of said couplers having a main conduction path included in said transmission system and an auxiliary conduction path adapted to sample a portion of said echoes to the exclusion of said signals in said main path, the other of said couplers having a main conduction path included in said transmission system and an auxiliary conduction path adapted to insert electrical signals into said main path, the portion of said transmission system including said main paths of each of said couplers comprising a transmission path having a first amplitude attenuation characteristic, a reentrant branch conduction path connected to said transmission path and including said auxiliary conduction paths of each of said couplers, said reentrant branch having an electrical length substantially an odd mulitple of half wavelengths different from the electrical length of said transmission path.

10. The combination according to claim 9 wherein said reentrant branch including said couplers has an amplitude attenuation characteristic substantially equal to said first amplitude attenuation characteristic.

11. In combination with a shielded transmission system carrying electromagnetic microwave signals in a first direction of transmission and echoes of said signals in the opposite direction of transmission, a pair of spaced directional couplers, one of said couplers having a main conduction path included in said transmission system and an auxiliary conduction path adapted to sample a portion of said echoes to the exclusion of said signals in said main path, the other of said couplers having a main conduction path included in said transmission system and an auxiliary conduction path adapted to insert electrical signals into said main path, the transmission path including said main paths of each of said couplers having a first amplitude attenuation characteristic, a reentrant branch conduction path connected to said transmission path and including said auxiliary conduction paths of each of said couplers, said reentrant branch having a second amplitude attenuation characteristic, and amplifier means included in said reentrant branch having an amplitude attenuation characteristic substantially equal to the quotient of said first amplitude attenuation characteristic divided by said second amplitude attenuation characteristic.

12. In combination with a shielded transmission line carrying electromagnetic microwave signals in a first direction of transmission and echoes of said signals in the opposite direction of transmission, a pair of spaced directional couplers connected in said transmission line, one of said couplers adapted to divert a given portion of the wave energy traveling in said opposite direction and to pass the remaining energy thereof, the other of said couplers adapted to combine a portion of said diverted energy with a portion of said remaining energy, and amplifier means for said diverted energy connected between said couplers, said amplifier means having a gain such that the amplitude of said combined portion of said diverted energy substantially equal to the amplitude of said portion of said remaining energy.

13. An echo suppression circuit for canceling reflected electromagnetic waves in a microwave transmission system comprising a first conduction path comprising a wave guide inserted in said system in the presence of said reflected waves, a second conduction path comprising a wave guide having two spaced portions each laterally contiguous to said first wave guide conduction path, directionally selective coupling means between said guides at each of said portions, said means comprising a common wall portion between said guides at each of said contiguous portions, said common wall portion having at least one aperture therethrough, and an amplifier means included in said conduction path between said contiguous portions.

14. The combination according to claim 13 wherein the transmission characteristic of said path between said portions matches the transmission characteristic of said second path including said amplifier between said portions.

WILLARD D. LEWIS.

REFERENCES CITED

The following references are of record in the file of this patent:

UNITED STATES PATENTS

| Number | Name | Date |
|---|---|---|
| 1,921,063 | Affel | Aug. 8, 1933 |
| 2,291,555 | Nyquist | July 28, 1942 |
| 2,369,268 | Trevor | Feb. 13, 1945 |
| 2,375,223 | Hansen | May 8, 1945 |